United States Patent
Streeter et al.

(10) Patent No.: US 9,094,606 B2
(45) Date of Patent: Jul. 28, 2015

(54) MOTION COMPENSATION IN RANGE IMAGING

(75) Inventors: Lee Vincent Streeter, Hamilton (NZ);
Adrian Andrew Dorrington, Hamilton (NZ); Andrew Dean Payne, Papamoa (NZ)

(73) Assignee: WaikatoLink Limited, Hamilton (NZ)

(*) Notice: Subject to any disclaimer, the term of this patent is extended or adjusted under 35 U.S.C. 154(b) by 360 days.

(21) Appl. No.: 13/541,547

(22) Filed: Jul. 3, 2012

(65) Prior Publication Data
US 2013/0176445 A1    Jul. 11, 2013

Related U.S. Application Data

(60) Provisional application No. 61/504,244, filed on Jul. 4, 2011, provisional application No. 61/528,655, filed on Aug. 29, 2011.

(51) Int. Cl.
*H04N 5/232* (2006.01)
*G01S 17/36* (2006.01)
*G01S 17/89* (2006.01)

(52) U.S. Cl.
CPC ............ *H04N 5/23254* (2013.01); *G01S 17/36* (2013.01); *G01S 17/89* (2013.01)

(58) Field of Classification Search
CPC ......... G01C 3/08; G01S 7/4811; G01S 17/89; G01S 7/4865
USPC ................................................ 356/3.01–28.5
See application file for complete search history.

(56) References Cited

U.S. PATENT DOCUMENTS

| 2005/0111697 A1 | 5/2005 | Yamamoto et al. | |
|---|---|---|---|
| 2008/0231832 A1* | 9/2008 | Sawachi | 356/5.1 |
| 2011/0051118 A1* | 3/2011 | Sato et al. | 356/4.07 |

OTHER PUBLICATIONS

Zach et al. "a Duality Based Approach for Realtime TV-L1 Optical Flow", Pattern Recognition, vol. 4713, 2007 pp. 214-223.*
Zach et al., "A Duality Based Approach for Realtime TV-L1 Optical Flow", Pattern Recognition, vol. 4713, 2007, pp. 214-223.
Extended European Search Report (includes Supplementary European Search Report and Search Opinion) received for European Patent Application No. 12807707.0, mailed on Mar. 5, 2015, 6 pages.
Lindner et al., "Compensation of Motion Artifacts for Time-of-Flight Cameras", Lecture Notes in Computer Science, vol. 5742, 2009, pp. 16-27.
Tai et al., "Coded Exposure Imaging for Projective Motion Deblurring", Proceedings of IEEE Conference on Computer Vision and Pattern Recognition, 2010, pp. 2408-2415.

* cited by examiner

*Primary Examiner* — Luke Ratcliffe
(74) *Attorney, Agent, or Firm* — Morrison & Foerster LLP

(57) ABSTRACT

Methods and devices for correcting for motion blur in range cameras without increasing acquisition speed or reducing the overall quality of the distance determinations, by identifying moving objects in a scene and determining the speed and direction of the objects.

33 Claims, 18 Drawing Sheets

(a) Ground truth phase (left) and amplitude (right) at the start of $k = 1$.

(b) Ordinary blur in phase step measurements, steps $k = 1$ and $k = 5$.

(c) CE phase step measurements, steps $k = 1$ and $k = 5$.

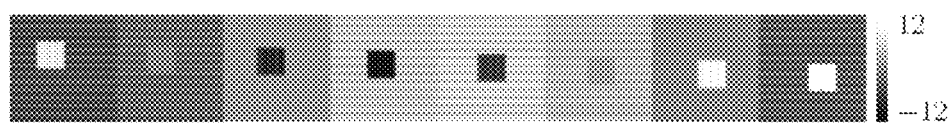
(a) The input eight phase step exposure coded sequence.
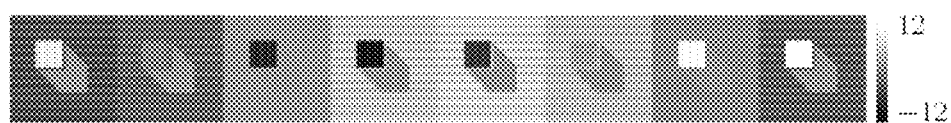
(b) The result of decoding and recomposition of a single phase step sequence via Eq. 15.
FIG. 11

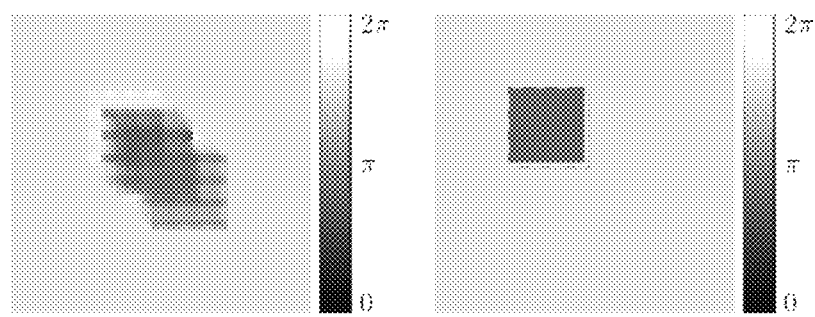
(a) Reconstructed phase before (left) and after (right) motion correction.
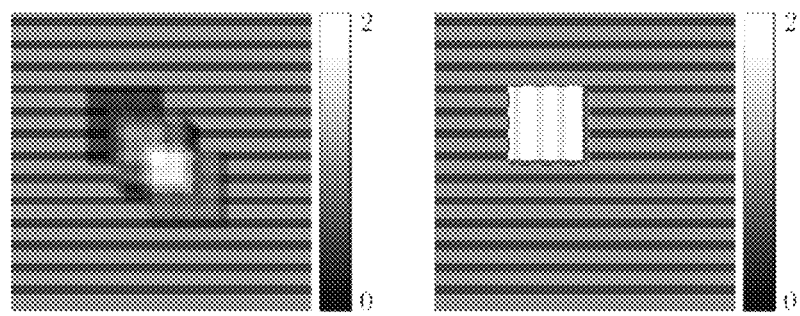
(b) Reconstructed amplitude before (left) and after (right) motion correction.
FIG. 13

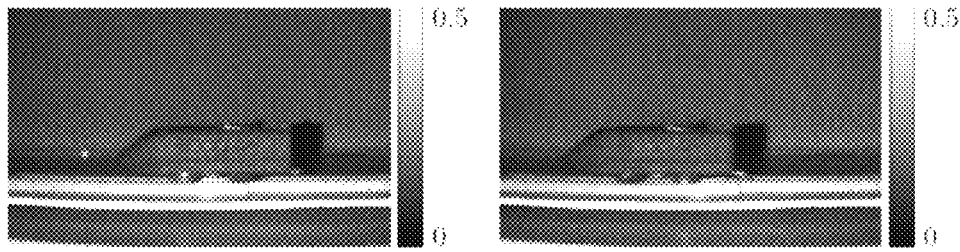

(a) Train sequence, simple two phase amplitude images of the first and last phase steps computed using simple two phase reconstruction. The train is moving horizontally from right to left. The images are displayed over a reduced range for visibility.

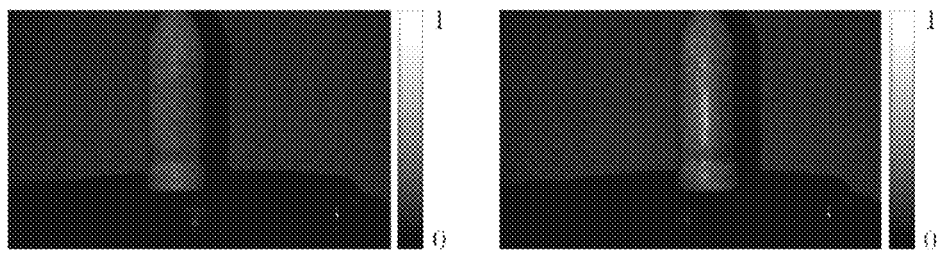

(b) Bottle sequence, amplitude images of the first and last phase steps. The bottle is on a circular turntable, in the sequence the motion is seen as horizontal from left to right.

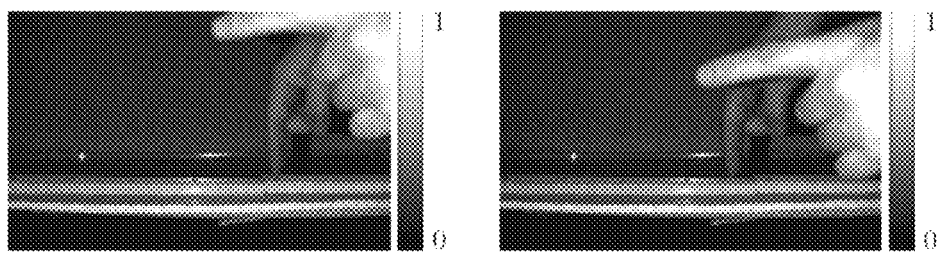

(c) Hand sequence, amplitude images of the first and last phase steps. The foreground hand is moving from top to bottom and the background hand is moving from right to left.

FIG. 14

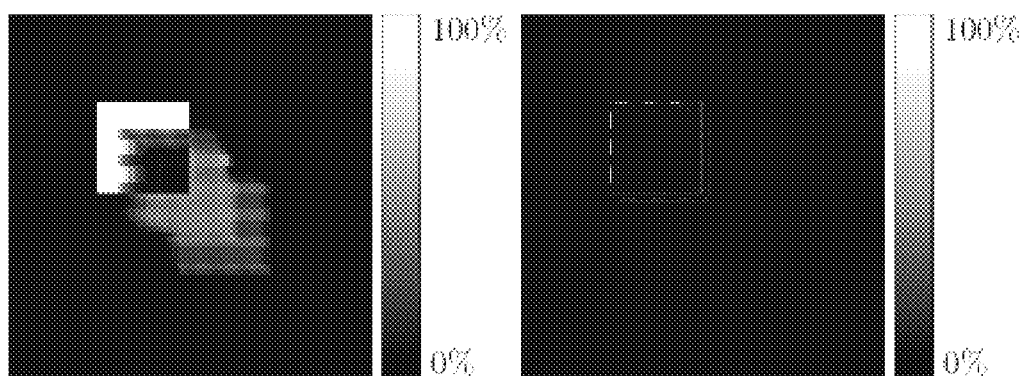
(a) Phase percentage error before (left) and after (right) motion correction.
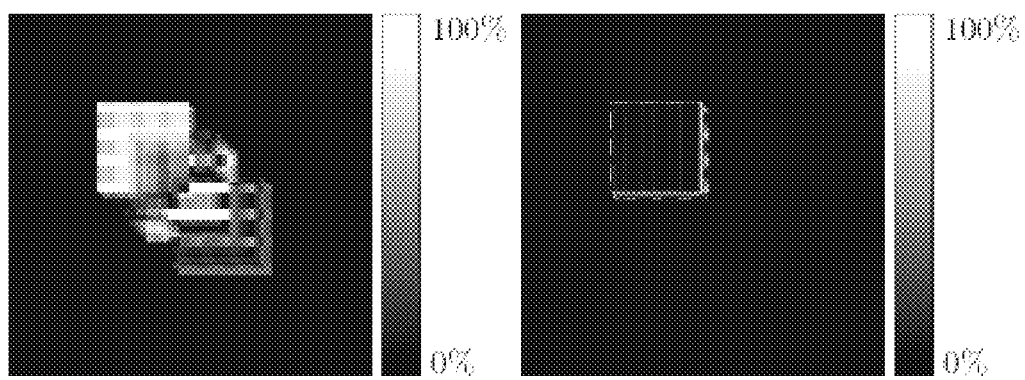
(b) Amplitude percentage error before (left) and after (right) motion correction.
FIG. 15

MOTION COMPENSATION IN RANGE IMAGING

CROSS-REFERENCE TO RELATED APPLICATIONS

This application claims the benefit, under 35 U.S.C. §119(e), of U.S. Provisional Patent Application No. 61/528,655, filed Aug. 29, 2011, and entitled "Motion Compensation in Range Imaging" and U.S. Provisional Patent Application No. 61/504,244, filed Jul. 4, 2011, and entitled "Motion Compensation in Range Imaging," the contents of which are incorporated by reference herein in their entirety for all purposes.

FIELD

This disclosure relates generally to methods and apparatuses that compensate for motion during range imaging.

BACKGROUND

Range cameras, also referred to as range imaging cameras, range imaging systems, and ranging devices, determine both distance and intensity for objects in a scene to be imaged. Range cameras are used in a variety of applications to determine the distance between an object and a camera. While typical range cameras are able to accurately determine distances to stationary objects, they are unable to accurately determine the distances to moving objects because they operate on an assumption that signal data received from a particular location in a scene is reflected to the camera from the same object located at the same distance from the camera during each of several samplings of the scene-dependent reflected light. When the objects move during imaging, this assumption may fail and errors may occur.

The difficulties in determining distance to moving objects are the result of the fundamental operation of typical range cameras. Range cameras typically utilize Amplitude Modulated Continuous Wave ("AMCW") technology to determine the distance between the camera and an object. Cameras using AMCW technology use a light source to emit an intensity modulated illumination signal to illuminate a scene to be imaged. The signal is then reflected back to the range camera by objects within the scene. Because the reflected signal slips out of phase with the emitted signal as the signal travels away from and back to the camera, multiple images of the reflected light are captured by a specialized sensor chip to record the phase differences at set periods of time. A processor is then used to compare the multiple images to each other and to the emitted intensity modulated illumination signal to determine phase changes in the intensity modulation of the light. The phase changes are then analyzed to determine the distance between the objects and the range camera, as well as to determine the size, shape, and location of the objects.

FIG. 1 illustrates a simplified version of a typical range camera. As shown in FIG. 1, a typical AMCW range camera 100 may include a signalling device 101 to emit an intensity modulated illumination signal towards a scene to be imaged and an image sensor 102 to capture images using the portions of the emitted signal that are reflected back to the system 100 from the objects within the scene. A processor 103 then compares the emitted signal with captured images to determine the intensity and the phase shift for each pixel in the captured image. By doing so, the processor is able to determine the distance the objects in the scene are from the system 100. The system 100 may optionally contain an input device 104 to control the system 100, a display 105, and a memory 106; or these devices 104, 105, and 106, may be in the form of a separate computer system connected by an interface cable. These devices may be chosen from among any of the known devices for performing such functions.

There are many known ways of modulating the signalling device 101 and the image sensor 102. For example, the signalling device 101 may simply be a light source that is cycled on and off very quickly, while the image sensor 102 may be modulated using a high speed shutter or by controlling the gain or sensitivity of the image sensor 102. The processor 103 may also include a signal generator, or a similar device, to assist in modulating the signalling device 101 and the image sensor 102. However, a signal generator may also be separately provided.

FIG. 2 is a functional diagram of the standard range camera described above with reference to FIG. 1. As shown in FIG. 2, the intensity modulation envelope of the illumination signal emitted from the signaling device 101 is shown as a sinusoidal wave shape (although it may also be modulated by a square wave). The signal is then reflected from various objects 21, 22, and 23 within the scene being imaged. As shown in FIG. 2, the light reflected back to the image sensor 102 will travel different distances based on the relative distances of the objects 21, 22, and 23 reflecting the light. This will result in the received light's modulation having different phases based on the distance traveled. Although not shown in FIG. 2, the amplitude of the waveform may also change based on the distance traveled and surface scattering properties of the objects.

SUMMARY

Described are methods and devices for correcting for motion blur in range cameras without increasing acquisition speed, and without reducing the overall quality of the distance determinations. The methods and devices are designed to identify moving objects in a scene, and to determine the speed and direction of the objects. In some embodiments, the movement of the objects in a scene is tracked and/or predicted. This information is more useful in some applications, such as gesture recognition applications, than the distance determination itself.

An exemplary embodiment includes a method of determining a distance between a range imaging device and at least one moving object, the method comprising: acquiring, at an image sensor, phase step range image data related to a scene containing at least one moving object utilizing a coded exposure, the phase step range image data comprising a first phase step image and at least a second phase step image; calculating an initial estimate of a distance between the image sensor and the at least one moving object, and an initial estimate of a brightness of the at least one moving object using a processor, wherein the estimates are based on the acquired phase step range image data; calculating an optical flow of the moving object based on: i) the initial estimate of the distance between the image sensor and the at least one moving object; ii) the initial estimate of the brightness of the at least one moving object; iii) the first phase step image; and iv) the second phase step image; generating motion corrected image data by applying an inverted coded exposure to the phase step range image data to correct for the calculated optical flow; and calculating a distance between the image sensor and the at least one moving object based on the corrected image data.

Depending on the application of the method, the coded exposure may preferably include a sine function or a square wave; the initial estimate of a distance between the image sensor and the at least one moving object may be a two phase estimate, and the optical flow may be calculated using a linear approximation. The method may also include illuminating the scene using an amplitude modulated continuous wave signal.

An alternate embodiment may include a method of determining a distance between a range imaging camera and a plurality of moving objects, the method comprising: capturing raw sequence data at an image sensor using a coded exposure, the raw sequence image data comprising a plurality of sequential phase step images of a scene comprising the moving objects; receiving the raw sequence image data at a processor; estimating a two phase estimate of a distance between the range imaging camera and each of the moving objects; generating a motion mask, utilizing the sequential phase step images, to identify areas in the raw sequence image data that include image data related to the moving objects; segmenting the raw image data utilizing the motion mask to isolate an area of the raw image data corresponding to each of the moving objects; determining an optical flow of each of the moving objects based on the two phase estimates and the object segmentation; calculating a magnitude and a direction of the optical flow of each of the moving objects; rotating and scaling the sequential phase step images based on the calculated magnitude and direction of the optical flow of each of the moving objects; motion inverting the rotated and scaled sequential phase step images to compensate for the motion of the moving objects; reversing the rotating and the scaling of the sequential phase step images to generate motion corrected sequential phase step images; decoding the motion corrected sequential phase step images using the coded exposure to generate a motion corrected phase step sequence; and calculating the distance between the range imaging camera and each of the moving objects based on the motion corrected phase step sequence.

This method may further include capturing the raw sequence image data using an image sensor, such as a CMOS sensor. Additionally, the two phase estimate may include estimated distance and/or brightness data for each of a plurality of pixels. The optical flow may be represented by a plurality of vectors, each of which is associated with one of the plurality of pixels. The optical flow may be determined using a linear approximation.

Depending on the application of the method, the coded exposure may preferably include a sine function or a square wave. Also, the scene may be illuminated using an illumination signal modulated by a signal generator. Additionally, calculating the distance between the range imaging camera and each of the moving objects may include decoding a distance for each pixel in the motion corrected phase step sequence.

An alternate embodiment may include a range imaging camera, comprising: an illumination source to illuminate a scene using a modulated illumination signal; an image sensor to capture raw sequence image data from the illuminated scene using a coded exposure, wherein the image sensor is configured to capture at least a portion of the modulated illumination signal reflected from at least one moving object in the illuminated scene; and a processor to process the raw sequence image data to correct for motion in the captured raw sequence image data, wherein the processor is configured to perform the following: calculating a two phase estimate of a distance between the range imaging camera and the moving object based on the raw sequence image data; generating a motion mask, based on the raw sequence image data, to identify areas in the raw sequence image data that includes image data related to the moving object; segmenting the raw sequence image data to isolate an area of the raw sequence image data corresponding to the moving object based on the motion mask; determining an optical flow of the moving object based on the two phase estimate and the segmented raw sequence image data; calculating a magnitude and a direction of the optical flow of the moving object; rotating and scaling the raw sequence image data based on the calculated magnitude and direction of the optical flow of the moving object; motion inverting the rotated and scaled raw sequence image data to compensate for the motion of the moving object; reversing the rotating and the scaling of the raw sequence image data to generate motion corrected sequence image data; decoding the motion corrected sequence image data using the coded exposure to generate decoded motion corrected sequence image data; and calculating the distance between the range imaging camera and the moving object based on the decoded motion corrected sequence image data.

According to various embodiments: the illumination signal may be modulated with an amplitude modulated continuous wave; the image sensor may be a CMOS sensor; the coded exposure may include a square wave or a sinusoidal wave; the image sensor may transmit the raw sequence image data to the processor; the image sensor may include a pixel array; the two phase estimate may include estimated distance data for each of a plurality of pixels; the two phase estimate may include estimated brightness data for each of a plurality of pixels; the optical flow may be represented by a plurality of vectors, each of the plurality of vectors associated with one of the plurality of pixels; the determining the optical flow may include a linear approximation; and the calculating the distance between the range imaging camera and the moving object may include decoding a distance for each pixel in the decoded motion corrected sequence image data.

DETAILED DESCRIPTION OF THE DRAWINGS

FIG. 11 depicts an example of the results of a comparison of an input phase step sequence and a motion correction equation.

FIG. 13 depicts exemplary images of range phase and amplitude before and after motion correction.

FIG. 14 depicts three examples of two phase step amplitude images.

FIG. 15 depicts the results of a simulation comparing phase percentage error and amplitude percentage error between images prior to and following motion correction according to various embodiments.

DETAILED DESCRIPTION

Described are methods and devices to correct for motion in an imaged scene in order to provide an accurate determination of the distance between a range camera and one or more moving objects. Typical range cameras operate on an assumption that objects are in the same position for each phase step measurement. When this assumption is false due to objects being imaged at different positions in successive phase steps, the cameras are unable to accurately determine the distances to the objects. In contrast, the methods and devices described below isolate data related to moving objects, to estimate the speed and direction of the movement of each object, to correct several sequential images by mathematically "moving" each object back to its starting position, and to determine the distance to each object at its starting position.

Figure 1:
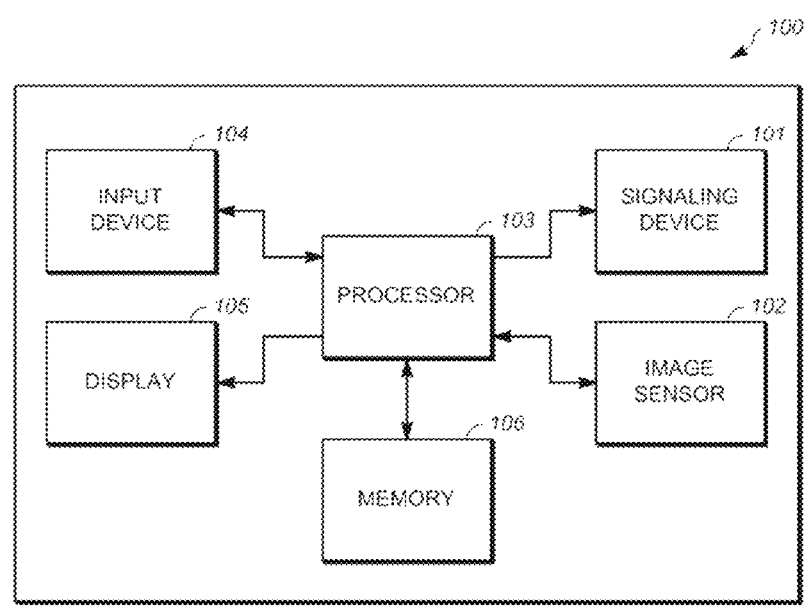
FIG. 1 depicts a schematic diagram of a standard imaging device.
Figure 2:
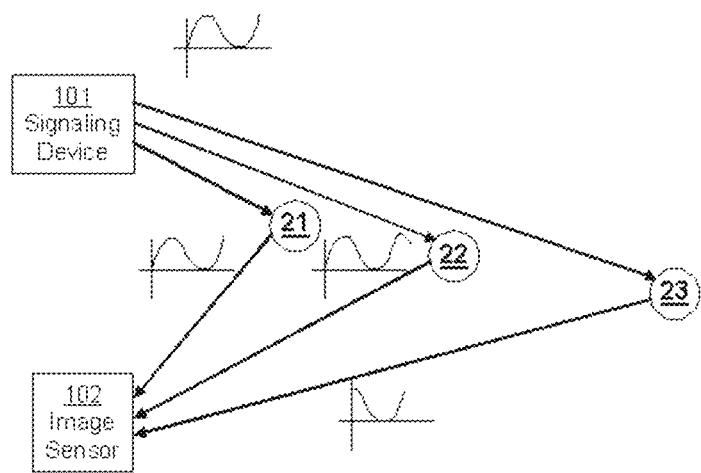
FIG. 2 depicts a simplified functional diagram of the standard range camera described above with reference to FIG. 1.
Figure 3:
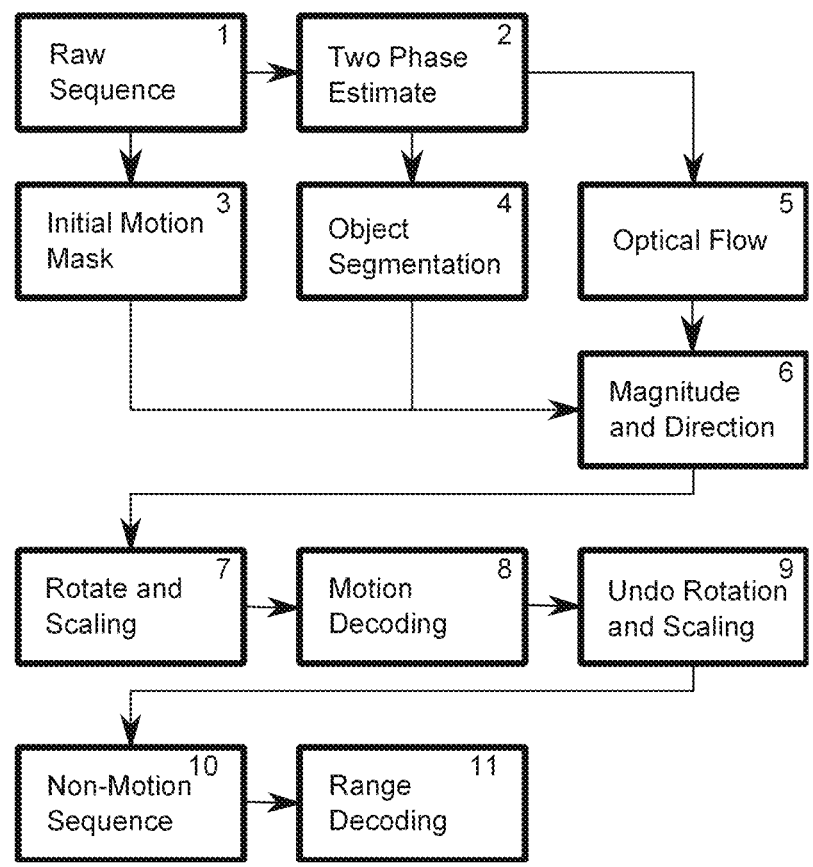
FIG. 3 depicts a block diagram of a motion compensation method according to various embodiments.

An example of a process for correcting motion blur and calculating a distance to a moving object appears in FIG. 3. The process includes (1) Receiving a Raw Sequence; (2) Estimating a Two Phase Estimate; (3) Generating an Initial Motion Mask; (4) Segmenting the Raw Image Data; (5) Determining an Optical Flow; (6) Calculating the Magnitude and Direction of the Optical Flow; (7) Rotating and Scaling the Phase Step Images; (8) Motion Inverting the Rotated and Scaled Phase Step Images; (9) Reversing the Rotation and Scaling; (10) Decoding the Motion Corrected Images; and (11) Calculating the Range. These blocks will be described in detail below.

Prior to correcting for motion blur, it may be necessary to generate the raw sequence data that is to be corrected. This data is typically generated using an AMCW range camera that emits a modulated illumination signal generated by modulating a signaling device. This modulated signal leaves the range camera at a known time. The modulated signal then travels away from the camera at a known speed before being partially reflected back to the range camera by objects in front of the camera. (The viewing area of a range camera, as well as the objects therein, is herein referred to as a scene.) The reflected light is then focused onto an image sensor that typically includes a pixel array, where it is captured. The image sensor is typically modulated using the same signal that is used to modulate the signaling device. This process is referred to as homodyne AMCW. Alternatively, the signals driving the image sensor and the light source may be modulated at different frequencies. This is referred to as heterodyne AMCW. The range camera is then able to compare the phase of the modulated illumination signal with the phase of the captured image to determine the distance the signal traveled between being emitted and being captured.

In practice, it has been found that more than one captured image may be necessary to get accurate results. Accordingly, in typical range cameras the image sensor will capture four or more images of a scene in order to more accurately determine the distance between the camera and various objects in a scene being imaged. Regardless of the format the images are captured in, the images can be referred to as "raw" images to indicate that they are unprocessed. The range cameras use the successive raw image data to compare the phase shift at each pixel in a pixel array of the image sensor to determine the distance to the portion of an object being imaged on that pixel. The processed image data is typically called a range image frame, or simply a frame.

This process may be modeled by assuming that the light source is amplitude modulated at frequency f (ideally according to a sinusoidal amplitude modulation profile or a square wave modulation profile), and that the sensor is modulated at the same frequency but with a phase offset θ. The light intensity measured at the sensor can then be modeled as:

$$I(x,\theta) = A(x)\sin(\phi(x)+\theta) + B(x), \quad (1)$$

where: $\phi(x) = d(x)4\pi f/c$; c is the speed of light; x is a pixel coordinate; A is the active brightness (and is proportional to the intensity of the returned light, object reflectance, and integration time); and B is an additive offset due to background light. The term B may also receive some contribution due to the sensor and source signal amplitude. The phase values induced by light travel, φ, are herein referred to as the range phase, whereas the phase offset values used for θ are herein referred to as phase step values. Values of I(x, θ) are referred to as phase step images due to their dependence on θ.

The reflected signal data is repeatedly gathered by the image sensor, and for each gathering repetition θ is varied in set to one of N distinct values, varied in even steps between repetitions—from 0 to 2π—in order to encode the distance from the range camera to an object that reflected the illumination signal in an invertible manner. The range encoded data is then analyzed by calculating the first order bin of the N point discrete Fourier transform over the I(x, θ) with respect to θ. The phase, φ, (and therefore the distance d) is recovered from the phase of the computed first order Fourier bin. The active brightness, A, is the corresponding amplitude.

Mathematical Modeling of Motion

The effect of the motion of the objects being imaged may be modeled by introducing time dependence on d (φ as φ(x(t), t)), A, and B, and the blur effect by convolution, *, by a blur kernel function h:

$$I(x(t),t) = [A(x(t),t)\sin(\phi(x(t),t)+\theta) + B(x(t),t)]*h(v(x,t)), \quad (2)$$

where v is the optical flow vector of the motion velocity vector through the scene. The convolution kernel, h(v(x, t)), is a spatially variant linear element beginning at each pixel and time point (x, t), with orientation ∠v(x, t) and length ‖kv(x, t)‖ pixels. It is helpful to omit the explicit dependence on x and t unless necessary (where omitted, the spatial and temporal dependence is implied).

Figure 4:
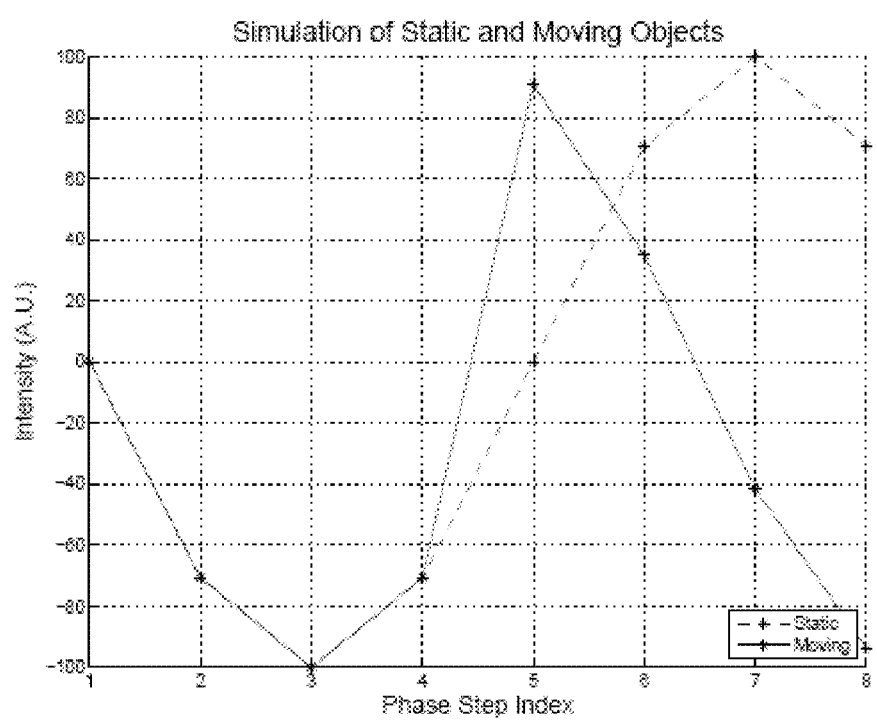
FIG. 4 depicts a simulated example of the effect of motion on a phase step measurement at a pixel.

FIG. 4 depicts a simulated example of the effect of motion on a phase step measurement at a pixel. More specifically, FIG. 4 charts the intensity and phase step index of both a static and a moving object imaged on a pixel over time. The data for the static object assumes that the object is positioned a suitable distance away from the camera in order to induce a phase of π (e.g., d=3(m) at f=25 MHz). The data for the moving object assumes that the object is stationary over the first four phase steps and therefore induces a phase of π over those steps. It is then assumed that the object begins to move at a time between the fourth and fifth phase steps, such that the phase becomes (π+1) for the last four phase steps. When the objects are decoded using standard techniques, the static object is determined to have a range phase of π, while the moving object in this particular case is determined to have a range phase of $(\pi+1)/2$. Phases induced by motion other than the motion described above, or a change in distance between phase steps other than the fourth and fifth, will result in a different, also erroneous, computed range phase.

Figure 5A:
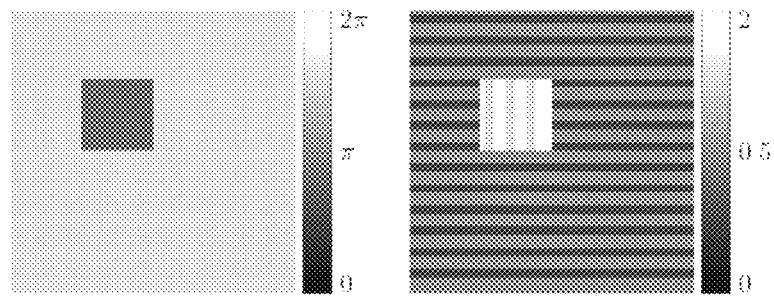
FIGS. 5a-5c depict a simulation of range phase, active amplitude, and example measurement using typical methods and Coded Exposure (CE).
Figure 5B:
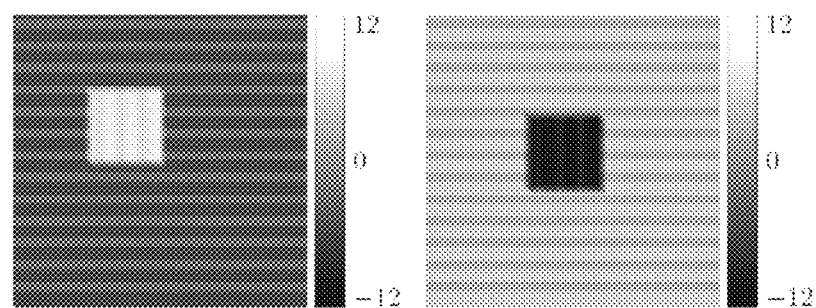
Figure 5C:
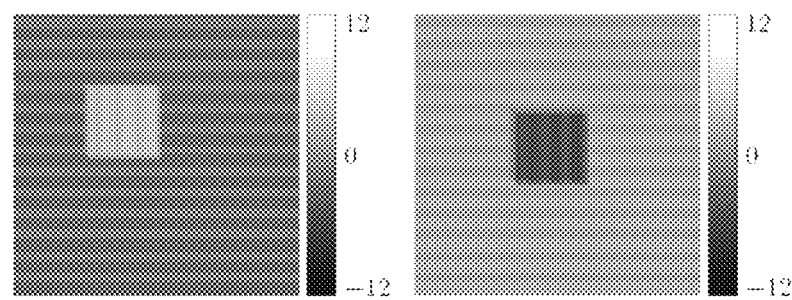

Additionally, motion blur is expected to appear in each phase step image in the spatial dimension as shown in the simulation of FIGS. 5a-5c, which depict a simulation of range phase, active amplitude, and example measurement using typical methods and Coded Exposure (detailed below). FIG. 5a depicts the initial phase and amplitude of a scene having a foreground object (the dark square in the phase image) moving in a diagonal direction from the top left of the scene to the bottom right. Traditionally, motion blur would occur due to the opening of the shutter, the integrating of the image data, and then the closing of the shutter at each phase step as shown in FIG. 5b. However, while the example describes the effect as being the result of the opening and closing of a shutter for the sake of simplicity, it is noted that modern AMCW range cameras use image sensors such as CCDs or CMOS devices instead of shutters. These devices may yield results similar to that shown in FIG. 5b as well.

For ordinary motion blur h is a linear element of finite support consisting of constant positive values, accordingly the use of Coded Exposure ("CE") has been proposed. CE is a process designed to at least partially correct for motion blur. In the present disclosure, CE is adapted to move an object back to its starting position in images taken at successive phase steps. Because a moving object is imaged on different pixels during successive phase steps, as discussed above, a comparison of the first pixel at a first phase step to the first pixel at a second phase step would introduce an error because the pixel has effectively imaged two different things, i.e., the object and then the background. Consequently, it is helpful to essentially shift the moving object back into the position that it was in during the first phase step such that the range camera is able to compare data related to the same object at subsequent phase steps. To do this, CE may be used. CE adds another modulation to the image sensor. This added code applies a code of ons and offs (1s and 0s) to the image data.

CE is a technique for regularizing the motion blur that can occur when acquiring image data. Equation (2) can be re-written in a simplified form as:

$$I = I_0 * h, \quad (3)$$

Consequently, the Fourier transform, $FT(\bullet)$ and inverse Fourier transform, $IFT(\bullet)$ can be used to determine that:

$$I_0 = IFT\left(\frac{FT(I)}{FT(h)}\right) \quad (4)$$

where the division is performed element wise in Fourier space. Equation (4) is therefore valid when the Fourier transform of the convolution kernel, h, has no zeros—that is, when H in equation (6) below is well conditioned.

A code may therefore be selected by a custom implementation of a genetic algorithm having an objective function that prefers codes with a maximal minimum absolute Fourier coefficient, minimal variance of the absolute Fourier coefficients, and the same number of ones as there is zeros. Where it is undesirable to have the moving objects leave a scene during the image capture period, it is preferred to select an acquisition time that is long enough such that the code is resolved to about one pixel per code step or more. Accordingly, for an n point code, a moving object should not move much fewer than n pixels during the capture, although slightly fewer is permissible. A short code is therefore preferable. An example of such a code is:

$$h = [1,0,0,1,1,0]. \quad (5)$$

The effect of CE on the motion blur is that the kernel takes on the same form as the code, and selection of a suitable code leads to an invertible blur. When the shutter is modulated by an exposure code, the blur pattern is altered as shown in FIG. 5c, such that the contrast of the different regions in the encoded images is lower than the same contrast in a blurred image that does not use CE. The reduced contrast is due to the shutter being open for a shorter time than in ordinary image capture. This is an undesired tradeoff for making the motion blur invertible.

The blur function h is a one dimensional element, starting at position x, orientated at angle $\angle v$ with length $\|v\|$, and is zero elsewhere. Assuming that the motion vector points from the top to the bottom and has a length of one (or equivalently, that $\angle v$ and $\|v\|$ are known), and that the image has been rotated and scaled suitably, the convolution can be rewritten in matrix form as:

$$I = H^T I_0, \quad (6)$$

where $I_0$ is the true underlying image data, and H is a banded circulant Toeplitz matrix constructed from the exposure code zero padded so that Equation (6) is dimensionally consistent.

The encoding of motion is not precisely the same for each phase step, at least in that it utilizes the object translation in addition to the coded exposure. Accordingly, a matrix $H_k$ may be used to represent each phase step image, where:

$$I_k = H_k^T I_{0,k}, k = 1 \ldots N. \quad (7)$$

For the kth phase step, $H_k$ is a banded circulant Toeplitz matrix constructed from the 1×N sequence:

$$[0_{(k-1)n}, h, 0_{N-kn}], \quad (8)$$

where $0_m$ is a vector of zeros of length m, and n is the length of h. This sequence represents the first row of $H_k$, and the positioning of h in the first row corresponds to the translation of the object motion from the initial position in the phase step sequence. Consequently inversion of the matrices both inverts the exposure coding and translates objects in the image by (k-1)n pixels upwards, provided that the motion between frames is accurately known. The motion decoding step then shifts the moving object back to the initial position.

Once the raw sequence data is generated, it can then be subjected to the process for correcting for motion blur. Each step of this process, and exemplary variations thereof, will now be explained in more detail below.

(1) Receiving a Raw Sequence

As discussed above, the incoming sequence can be acquired by a range camera utilizing an exposure code at each phase step. In the examples discussed below, it is assumed that eight phase steps, evenly space between 0 and $2\pi$, are used. These phase steps may be modeled as:

$$\theta_k = 2\pi \frac{k-1}{8}, \quad (9)$$
$$k = 1, 2, \ldots, 8.$$

The exposure code h(t) may be defined by a sequence of ones and zeros, where the zeros normally correspond to closure of the shutter—or to a similar function performed by a device such as a CMOS sensor. Rather than simply closing the shutter, h(t) data may be acquired at the zeros using an extra phase shift of π/2 (radians) in order to acquire phase step data according to sine and cosine modulation almost simultaneously.

According to various embodiments, the coded exposure code may utilize a six point sequence of ones and zeros alternating in a pseudo-random pattern. During the ones, the acquisition is performed according to a sine wave, while the acquisition is performed according to a cosine wave during the zeros. This acquisition yields raw sine (Is) and cosine (Ic) data. Additionally, in certain devices periodic square waveforms with a zero or ninety degree phase offset (or similar waveforms) may be used in place of the sine and cosine waveforms.

Additionally, the coded exposure may be implemented on the hardware of the range cameras in an interleaved form. Unlike previous uses of coded exposure techniques, embodiments of the present disclosure may use short codes (as opposed to much longer codes used in other applications) in order to mitigate the effects of moving objects entering or exiting the scene during image capture.

(2) Estimating a Two Phase Estimate

Once the raw sine (Is) and cosine (Ic) sequence data is acquired using coded exposure, initial estimates of the distances to the objects in the scene and their brightness are made. This is done by estimating the range phase, $p_{0,k}$, at the kth phase step, as:

$$p_{0,k}(x, y) = \tan^{-1}\left(\frac{I_{s,k}}{I_{c,k}}\right) - \theta_k. \quad (10)$$

A modulo-2π, operation on $p_0$ may be necessary to ensure $0 \leq p_0 \leq 2\pi$. Similarly, an initial estimate of the active amplitude A may be computed as:

$$A_{0,k}(x, y) = \frac{1}{2}\left(\frac{I_{c,k}}{\cos(p_{0,k})} + \frac{I_{s,k}}{\sin(p_{0,k})}\right) \quad (11)$$

Figure 6:
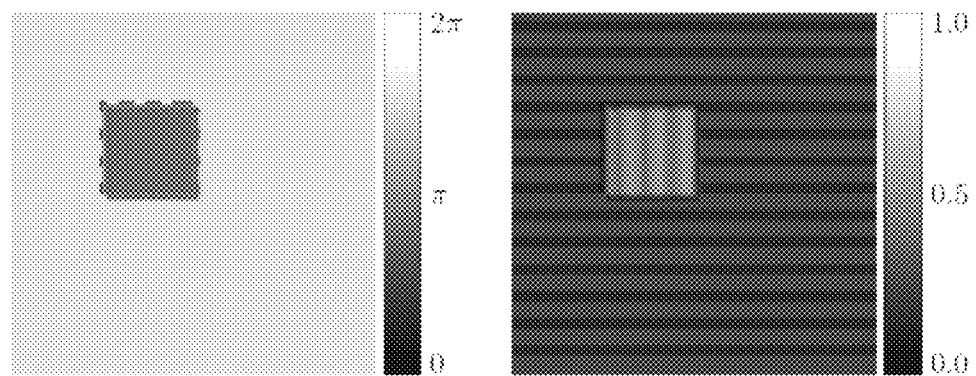
FIG. 6 depicts examples of two-phase estimates from interleaved CE AMCW measurements.

Examples of initial estimates are shown in FIG. 6, where the overlapping acquisition of Is and Ic ensures the initial estimates have minimal susceptibility between phase step motion artifacts. However, as shown in FIG. 6, because of the motion of the object being imaged errors may be seen near the edges, while blurring of the vertical stripe pattern may also occur. The initial estimates are highly susceptible to phase linearity errors that may occur due to higher order harmonics causing the phase step measurements to not quite fit an ideal sinusoidal waveform. Furthermore $p_0$ and $A_0$ may be highly susceptible to random noise. Regardless, $p_0$ and $A_0$ form useful initial estimates for use in the processing steps to follow.

According to further embodiments, raw sequencing may be performed to fit the "mixed pixel problem." This may be accomplished by quickly interleaving repeated and accumulated acquisition at two or more different frequencies. As a result, the raw sequence measurements will contain the sum of responses from a moving foreground object and a background object. The foreground and background objects can then be separated using a mixed pixel disambiguation.

Additionally, while the examples herein use eight phase steps, any number of phase steps may be used. However, it is preferable to use an even number of phase steps to simplify the initial motion mask step discussed below.

The determination of the two-phase estimate is at least partially dependent on the form of the raw sequence data, as well as on the type of data used in the subsequent processing steps. Accordingly, the determination process may be adapted to support changes in these other processes. For example, if the raw sequence is modified such that the motion fits the mixed pixel problem as discussed above, then it may not be necessary to even perform the two-phase estimation step. The step may also be unnecessary if the optical flow is adapted to be performed on the phase step sequence, or if object segmentation is performed on the optical flow result.

(3) Generating an Initial Motion Mask

Figure 7:
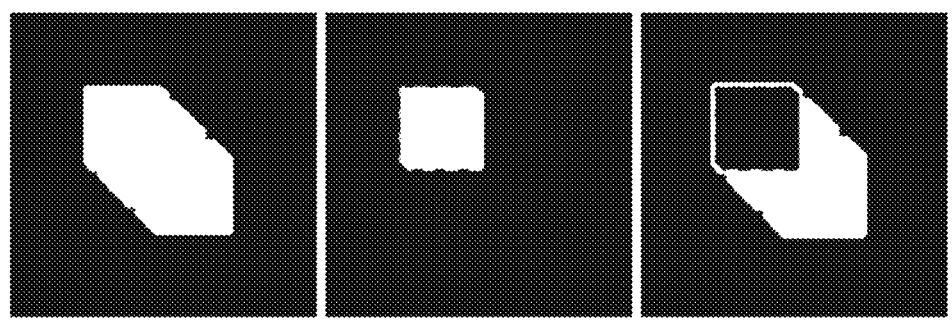
FIG. 7 depicts an example of a motion mask image.

An initial motion mask is then generated using the sequential phase step images of the raw sequence data. The motion mask is used to identify where motion occurred throughout the phase step sequence, in order to properly decode the motion. Additionally, it is important to be able to distinguish between one moving object and another. This may be accomplished by identifying separate regions of different motion and generating a corresponding refinement of the motion mask. In order to identify these regions it is helpful to rely on an understanding that the average of any two phase step measurements that are π radians out of phase from each other is likely to be zero. This is generally true when a fixed pattern offset is removed (as may be performed in the preprocessing step described below). First, eight evenly spaced phase step measurements are taken such that the four pairs of phase step measurements each average to zero. (While eight phase step measurements are used in this example, there is no limit to the number of steps that may be used.) A threshold operation on the absolute value of such averages involves a set of four motion masks. The threshold may be chosen by an outlier detection—when the kurtosis of the data in the four average images that do not meet the threshold is close to three, this is an indication that no outliers remain. The computation of the threshold value may be performed automatically by inspecting the kurtosis of the data remaining after application of a range of threshold values. The threshold values tested may be identified by:

$$t = \frac{i\sigma}{10}, \quad (12)$$
$$i = 1, 2, \ldots 40,$$

where σ is the standard deviation of the unthresholded image differences. A single combined motion mask estimate may therefore be obtained as the binary 'or' of the four mask images at each pixel. A median filter may then be used with a 3×3 window to remove stray 'on' or 'off' pixels. A flood fill operation may then be used to close holes in the motion mask. The resultant motion mask image, $m_m$, is depicted in the left hand image of FIG. 7.

Alternatively, generating the initial motion mask may include segmentation and tracking of objects, simple image differences on the two phase estimate output, alpha mapping, and thresholding the magnitude of the optical flow output, the sigma-delta algorithm, expectation maximization, or maximum likelihood estimation.

(4) Segmenting the Raw Image Data

The initial motion mask is then used to help segment the raw image data to identify objects at different distances and to determine if any moving objects may obscure other objects during their motion. When objects in the foreground and in the background are moving relative to each other, the regions of motion often include background areas that are occluded by foreground objects during some of the phase steps. It is therefore preferable to segment the background from the foreground. Furthermore, it is helpful to identify and isolate each moving object in a scene. In order to segment the objects, it is helpful to examine the histogram of the initial range phase images, $p_{0,k}$, at each phase step k, as follows:

The histogram of $p_0$ is taken with 100 bins over the range $[0, 2\pi]$.

A morphological watershed is taken of the histogram to identify the peaks, which are taken as the phase of particular objects.

A suitable threshold value between subsequent histogram peaks is then identified, yielding threshold values suitable for separating objects of different distances.

The logical "and" operation of the object segmentation and the motion mask is computed. Preferably, the largest objects are chosen, where the number of objects selected is user defined. The object motion mask for the ith object in the kth phase step may be represented as $m_{o,i,k}$, where the static background region is identified by i=0, the first moving object i=1, etc. The final object motion mask, excluding regions in which no motion is detected during the capture period, is computed by the element-wise operation $m_m m_{o,i,k}$, as shown in the right-hand image of FIG. 7.

Additional embodiments may utilize additional or alternate segmentation methods such as, morphological segmentation (tophat/bottomhat, watershed, etc.), region growing, adaptive thresholding, expectation maximization, or Markov random field segmentation followed by thresholding. Additional devices may also use an automated procedure to determine how many moving objects are present in a scene being imaged.

According to an embodiment, object segmentation may be performed by identifying objects of different ranges by examination of a histogram of the range phase from the initial two-phase estimate. A morphological watershed operation may be used to identify the location of peaks in the histogram. Separation of one group of phase values from another may be performed using a threshold method. When determining a segmentation scheme, it is helpful to carefully select range phase values that represent dominant objects in the scene being imaged.

(5) Determining an Optical Flow

Based on the initial two phase estimate, an optical flow estimate is then determined. Based on the optical flow and segmentation, the motion of objects can be determined. Optical flow is a model of the movement of the objects within the scene and is generally represented by a two dimensional vector at each pixel related to the movement of objects. When decoding the CE, it is helpful to have an accurate estimate of the direction and magnitude of the motion of objects being imaged by the camera. To estimate object motion, optical flow is used. More specifically, large displacement optical flow is used based on image warping with descriptor matching that is computed based on the initial amplitude estimates, $A_{0,k}$. The exemplary optical flow estimates discussed herein typically utilize a two dimensional vector, u(x, y), at each pixel. This vector includes the x and y displacement of the motion imaged at each pixel from one image frame to the next. It is realistic to expect large displacement of objects over the phase step sequence. For example, when using an eight phase step capture sequence, the motion from the first frame to the last may be expressed as being 7 (phase steps from first to last capture)×6 (pixels per phase step)=42 (pixels from first to last capture). A large displacement algorithm can cope with motion of the magnitudes expected in the below described phase step sequences.

The optical flow estimation process may also use illumination effects via the incorporation of a gradient consistency constraint in order to compensate for various factors including (but not limited to) invariance against additive brightness changes from one frame to the next—such as harmonic effects that are expected to produce additive effects in the simple amplitude image from one frame to the next. In some embodiments, it is possible to achieve satisfactory results without correcting for uneven illumination in the simple amplitude images and to instead rely on the regularization of the optical flow estimation to compensate.

According to various embodiments, a Brox algorithm may be used in determining the optical flow. However, other optical flow algorithms may be used. In some devices, the optical flow may be computed from the first frame through each successive frame in turn. However, in other devices, alternate algorithms may be used for successive frame pairs so that the flow vectors are tracked from the last frame to the first. Additionally, other devices may determine the optical flow based on the phase step sequence measurements themselves, thereby eliminating the need to perform the two-phase estimate described above. Additionally, by determining object motion directly from the phase step measurements may reduce the number of auxiliary processing steps. Alternate devices may use block matching and video codex derived approaches in place of determining optical flow. Such approaches may include, but are not limited to, using optical flow methods utilizing the Census transform, or performing warping using a non-equispaced inverse Fourier transform.

(5.1) Determining an Optical Flow Using a Non-Equispaced Inverse Fourier Transform In one embodiment, a non-equispaced inverse Fourier transform may be used to estimate optical flow at block 5 of FIG. 3. Equation (13) shows that a signal $f(x)$ can be warped in one dimension via a convolution with a warping function $w((x+u(x))$, with u(x) being the warping signal.

$$f(x+u(x)) = \int_{-\infty}^{\infty} dx' f(x') w(x+u(x)-x') \tag{13}$$

The act of convolution is to pick up the value $f$ at position x+u(x) and to place that value at the position x. To perform warping in the conventional sense, w would take the form of a delta function, so equation (13) can be written using the Fourier kernel delta sequence as:

$$\begin{aligned} f(x+u(x)) &= \int_{-\infty}^{\infty} dx' f(x') \int_{-\infty}^{\infty} dk e^{i2\pi k[x+u(x)-x']}, \\ &= \int_{-\infty}^{\infty} dk \hat{f}(k) e^{i2\pi k[x+u(x)]}, \end{aligned} \tag{14}$$

where $\hat{f}(k)$ is the Fourier transform of $f(x)$ and each summation is with respect to the differential term immediately right of the corresponding integral sign. Equation (14) is a non-equispaced inverse Fourier transform. In explicitly discrete form, let $W_x$ be the equispaced Fourier transform matrix, and let $W_{x+u(x)}$ be the non-equispaced equivalent, then the discrete signal $f(x)$ can be written as:

$$f(x+u(x)) = \frac{1}{N} W^*_{x+u(x)} W_x f(x) \tag{15}$$

where W* denotes a conjugate transpose operation on the matrix W. The matrix T such that:

$$T_{x+u(x)} = \frac{1}{N} W^*_{x+u(x)} W_x \quad (16)$$

then defines a warping transformation operator. Manipulation of the data in f is performed by manipulation of u(x) in T and then application of the corresponding operator T on f.

In a one-dimensional case, consider a second signal g(x) that is related to $f(x)$ as:

$$g(x) = f(x+u(x)) \quad (17)$$

Looking now to a two-dimensional case, application of the Fourier transform warping to determine optical flow may require additional consideration in order to obtain a reasonable solution. In one dimension, there are only two possible directions that the warping can operate in, either the positive or negative direction. In two dimensions, there are effectively an infinite number of directions. Equation (14) can be extended to the two-dimensional case:

$$f((x+u_x(x,y), y+u_y(x,y)) = \quad (18)$$
$$\iint_{-\infty}^{\infty} dl dk \hat{f}(k,l) e^{i2\pi l[y+u_y(x,y)]} e^{i2\pi k[x+u_x(x,y)]}$$

where both integrals are improper and definite. It can be seen that $u_x$ and $u_y$ are inside the complex exponential, so there is no clear weighting in terms of direction, other than to search in one or four directions, up-left, up-right, down-left, and down-right.

(5.2) Determining an Optical Flow Using a Non-Equispaced Inverse Fourier Transform In another embodiment, another non-equispaced inverse Fourier transform may be used to estimate optical flow at block 5 of FIG. 3. Equation (19) shows a signal function $f(x)$ and function by which that signal is to be warped u(x). Let $\hat{f}(k)$ be the Fourier transform of $f(x)$ and the action of warping can be performed by a non-equispaced warped inverse Fourier transform:

$$f(x+u(x)) = \int_{-\infty}^{\infty} dk \hat{f}(k) e^{i2\pi k(x+u(x))} \quad (19)$$

If $f(x)=\delta(x-x')$, the right side of equation (19) becomes:

$$\int_{-\infty}^{\infty} dk e^{-i2\pi kx'} e^{i2\pi k(x+u(x))} = \delta(x-x'+u(x)) \quad (20)$$

The action of the Fourier transform followed by the warping inverse transform is to pick up the value of the signal at location x and relocate that value at the new location x+u(x). Direct numerical implementation of the warped inverse Fourier transform can be slow, so it may be desirable to further develop the integral. While a continuous notation is used to describe the development of the integral, it should be appreciated that the application may be real, discrete, absolutely summable, numerical signals of finite range and support.

Initially, integration by parts to equation (19) may be performed N times to obtain a series expansion, where each application of integration by parts is performed on the last term of the resultant series. This produces the following equation:

$$f(x+u(x)) = e^{i2\pi ku(x)} \sum_{n=0}^{N} (-i2\pi u(x))^n \int^{n+1} dk^{n+1} \hat{f}(k) e^{i2\pi kx} \Big|_{k=-\infty}^{\infty} + \quad (21)$$
$$R_N,$$

where $$R_N = \int_{-\infty}^{\infty} dk e^{i2\pi ku(x)} (-i2\pi u(x))^{N+1} \int^{N+1} dk^{N+1} \hat{f}(k) e^{i2\pi kx} \quad (22)$$

is the remainder term for the expansion of the warped inverse Fourier transform. The N+1$^{th}$ term of the series and corresponding remainder may be obtained by applying integration by parts again to $R_N$.

In equation (21), the warping may be separated from the integral proper. The warping may be implemented in place at each pixel according to a series expansion. Before the series can be implemented, however, computation of the n+1 indefinite integrals for a general signal $\hat{f}(k)$ may be performed. Relate the Gaussian function $G(x)=e^{-a^2x^2}$, with corresponding Fourier transform $\hat{G}(k)$, to the signal $f(x)$ by a convolution:

$$\hat{f}(k) = \int_{-\infty}^{\infty} dk' \hat{c}(k') \hat{G}(k-k') \quad (23)$$

where $\hat{c}(k')$ is a coefficient function. Substitution of equation (23) into equation (21) and (temporarily) neglecting $R_N$ gives:

$$f(x+u(x)) = \quad (24)$$
$$e^{i2\pi ku(x)} \sum_{n=0}^{N} (-i2\pi u(x))^n \int^{n+1} dk^{n+1} \int_{-\infty}^{\infty} dk' \hat{c}(k') \hat{G}(k-k') e^{i2\pi kx} \Big|_{k=-\infty}^{\infty}$$

If the integral term in equation (24) is represented by $\Lambda_n$ and the order of integration is changed, the equation becomes $$\Lambda_n(x,k) = \int_{-\infty}^{\infty} dk' \hat{c}(k') I_n(k,k',x) \quad (25)$$

where $$I_n(k,k',x) = \int^{n+1} dk^{n+1} \hat{G}(k-k') e^{i2\pi kx} \quad (26)$$

then $\Lambda_n$ defines a sequence of coefficients of the $u(x)^n$ in the series expansion of the warped transform. Computing $\Lambda_n$ performs the spatial integration for warping by u(x) independent of u(x) itself. The use of the convolution with a Gaussian function permits the analytical computation of the indefinite integrals. While other functions can be used, the Gaussian function provides a desired form for the sequence of integrals. Let $I_{-1}(k,k',x) = \hat{G}(k-k') e^{i2\pi kx}$, it can then be shown that $$I_0(k,k',x) = \int dk \hat{G}(k-k') e^{i2\pi kx} \quad (27)$$
$$= -\frac{1}{2} G(x) e^{i2\pi k'x} \mathrm{erf}\left(\frac{i\pi x}{a} - (k-k')a\right)$$

Furthermore, let $$\alpha = (k-k') - \frac{i\pi x}{a^2} \quad (28)$$

then, for n≥1, by integration by parts and induction:

$$I_n(k,k',x) = \int^n dk^n I_0(k,k',x) \quad (29)$$

-continued $$= \frac{1}{n}\left(\alpha I_{n-1} + \frac{I_{n-2}}{2a^2}\right)$$

Let a tend large so that $G(x) \approx 1$ for all x, $\hat{G}(k)$ becomes approximately a delta function, and $$\Lambda_n(x,k) \approx -\frac{s_{k'-k}}{n!} \int_{-\infty}^{\infty} dk'(k-k')^n e^{i2\pi k'x} \hat{f}(k) \quad (30)$$

where $s_{k'-k}$ is the signum operation that arises from the error function in equation (27) with a large. Interpretation of $s_{k'-k}$ is obtained from consideration that the analytical integral is taken with respect to k, and that k and k' lie on the same domain. Therefore, only $s_{k'-k}$ need be considered with respect to k at each of the extreme endpoints of that domain. Namely, when $k \to \infty$, $\forall k' < \infty$ (conversely $-\infty$, $\forall k' > -\infty$), then $s_{k'-k} = -1$ (conversely 1). When k' reaches the endpoint that violates each inequality, then $s_{k'-k} = 0$, emphasizing further the fact that equation (30) is an approximation.

Equation (30) is an inverse Fourier transform up to a coefficient. Substituting equation (30) into equation (24), applying the binomial theorem to $(k-k')^n$, and further manipulation produces:

$$f(x+u(x)) \approx -\frac{s_{k'-k} e^{i2\pi ku(x)}}{2} \times \quad (31)$$

$$\sum_{n=0}^{N} \frac{u(x)^n}{n!} \sum_{r=0}^{n} \binom{n}{r} (-i2\pi k)^r IFT\left((i2\pi k')^{n-r} \hat{f}(k')\right)\Big|_{k=-\infty}^{\infty}$$

$$= -\frac{s_{k'-k} e^{i2\pi ku(x)}}{2} \sum_{n=0}^{N} u(x)^n \sum_{r=0}^{n} \frac{(-i2\pi k)^r}{r!} \frac{\partial_x^{n-r} f(x)}{(n-r)!}\Big|_{k=-\infty}^{\infty} \quad (32)$$

Equation (37) is in a simple form. Integration over k involving the spatially varying term u(x) and transformation into a series of solvable integrations that are independent of u(x) has been performed. The integrations are performed to obtain a nested series involved derivatives. The sequence that arises from computing the innermost series form the coefficients in a series in u(x), where those coefficients depend on $f(x)$ and may be computed ahead of time and without knowledge of u(x). After computation of the sequence, the warping according to a particular form of u(x) may be computed. For completeness, $R_N$ corresponding to equation (32) is provided below.

$$R_N \approx -\int_{-\infty}^{\infty} dk \frac{s_{k'-k} e^{i2\pi ku(x)}}{2} u(x)^{N+1} \sum_{r=0}^{N+1} \frac{(-i2\pi k)^r}{r!} \frac{\partial_x^{N+1-r} f(x)}{(N+1-r)!} \quad (33)$$

For suitably behaved functions $f(x)$ and u(x), the sequence $R_N$ tends to zero as N increases. However, this is not a guarantee that the series converges to the desired solution, or even a finite value. In view of this, the sum of the binomial expansion can be determined and the result of the outer summation can then be determined:

$$S_N = -\frac{s_{k'-k} e^{i2\pi ku(x)}}{2} \sum_{n=0}^{N} \frac{u(x)^n}{n!} \sum_{r}^{n} n! \frac{(-i2\pi k)^r}{r!} \frac{\partial_x^{n-r}}{(n-r)!} f(x)\Big|_{k=-\infty}^{\infty} \quad (34)$$

$$= -\frac{s_{k'-k} e^{i2\pi ku(x)}}{2} \sum_{n=0}^{N} \frac{u(x)^n}{n!} (-i2\pi k + \partial_x)^n f(x)\Big|_{k=-\infty}^{\infty} \quad (35)$$

$$\approx -\frac{s_{k'-k}}{2} e^{u(x)\partial_x} f(x)\Big|_{k=-\infty}^{\infty} \quad (36)$$

$$= e^{u(x)\partial_x} f(x) \quad (37)$$

The term $e^{u(x)\partial_x}$ may be recognized as being similar to the momentum translation operation in the field of physics. The momentum translation operator operating on a function is equivalent to the Taylor series on that function, so in the sense of a Taylor series approximation $$S_N \approx f(x+u(x)) \quad (38)$$

The series expansion converges if the Taylor expansion converges. The Gaussian, a, was taken to be large so that the Gaussian approximates a delta function in the Fourier domain. As a gets large, the limits of integration may be reduced with respect to k to be large enough to encompass most of the information under the Gaussian shifted to position k'. Considering equation (32), reducing the limits to which k goes to reduces the value of n required for the terms in the inner summation to go to zero, thereby resulting in fewer terms are required in the outer summation.

In a practical example, the limits of integration may be $k=-\frac{1}{2}$ and $k=\frac{1}{2}$. However, the limits of k can be made smaller to reduce the number of terms required. The series terms involving derivatives of $f(x)$ are computed ahead of time. Given a pair of digital signals $f(x)$ and $g(x)$ where $g(x)=f(x+u(x))=0$ then u(x) may be estimated by finding the roots of the equation that arises by replacing the warping of $f$ with equation (32).

In some embodiments, the following process can be used to estimate optical flow. Initially, a first frame and a second frame may be obtained. From a course resolution approximation through successively higher resolution approximations, the following operations can be performed: a) compute the Fourier warp sequence (e.g., the terms arising from the inner summation in equation (32)) on the second frame; b) iteratively estimate the warping from the second frame back to the first frame; c) accumulate the new estimate to the total estimate; and d) warp the second frame back towards the first frame according to the current estimate.

Optical flow can be a two-dimensional problem, meaning that at least two constraints may be required to obtain a solution. The first constraint can be a data constraint and the second constraint can be an external smoothness constraint. The data constraint was described above in sections 5, 5.1, and 5.2. The external smoothness constraint can ensure that the optical flow estimation does not diverge, but rather converges to a useful, finite solution. Some example external constraints that can be used include sum of squares of the magnitude of the gradient of each of the optical flow terms, sum of the squares of the Laplacian of each of the terms in the optical flow estimate (effectively minimization of the diffusion equation), total variation L1 (TVL1) norm, the Lorentzian function, median filtering, the Charbonnier function, and the like.

A solution to the optical flow problem can be found by simultaneously minimizing the data and the external smoothness constraints. To do so, an iterative solution can be used. In one example, a duality approach can be used, derived from the methods found in C. Zach, T. Pock and H. Bischof, "A duality based approach for realtime TV-L1 Optical Flow," Pattern Recognition, 4713(22), p. 214-223. 2007. The duality approach divides the total problem into two smaller and more easily solved subproblems. The prime subproblem solves the data constraint, for a prime solution and the dual subproblem solves the smoothness constraint, for a dual solution. The prime and dual solutions can be constrained to be similar to each other in a least squares sense. The data constraint can use an L1 norm. The degree of accuracy using Fourier Transform warping permits the use of a simple smoothing method. Convolution with a Gaussian of the prime solution estimate can be performed to form the dual solution. The dual solution can then be propagated through the scales.

(6) Calculating the Magnitude and Direction of the Optical Flow

Figure 8:
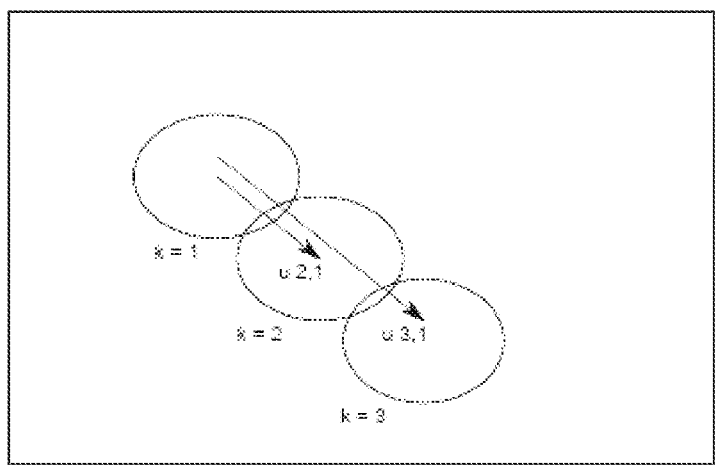
FIG. 8 depicts an example of the assumed linear motion of an object and the corresponding vectors.
Figure 9:
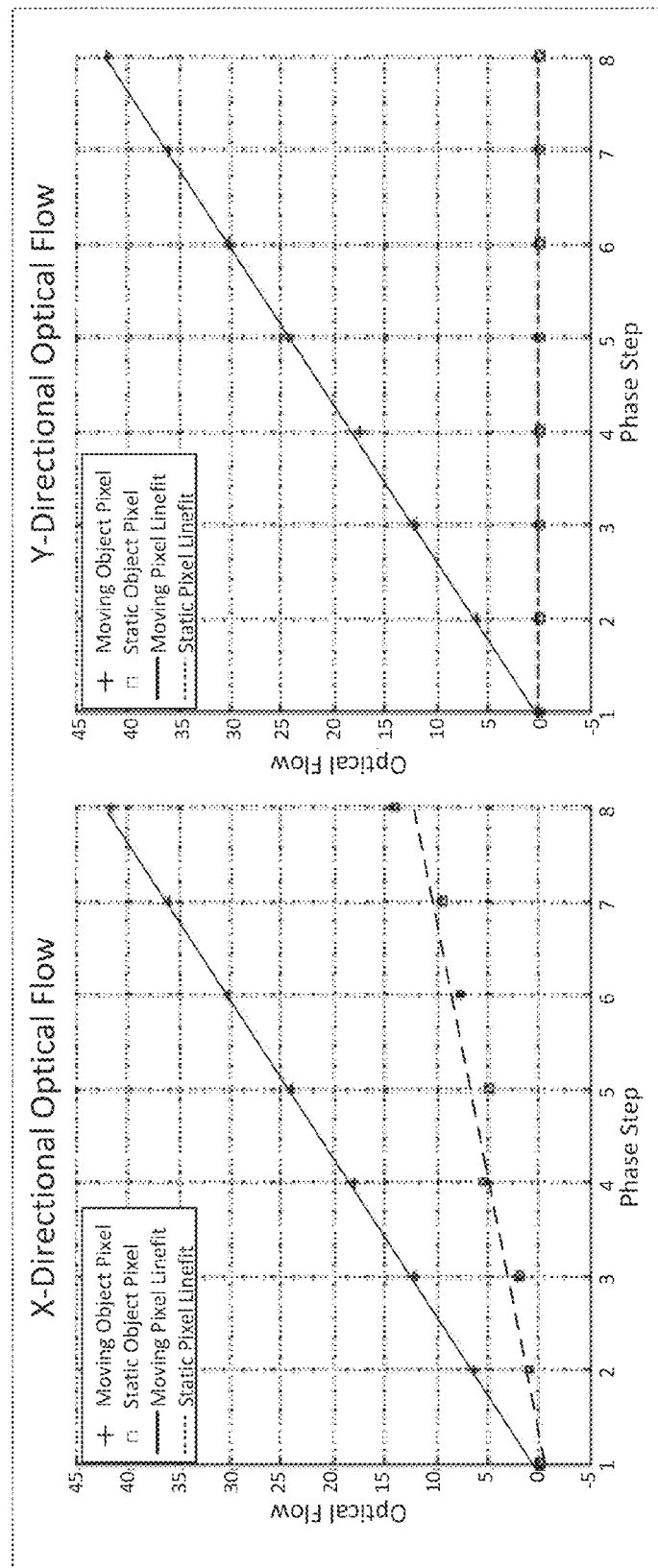
FIG. 9 depicts examples of the optical flow and line fitting.
Figure 10:
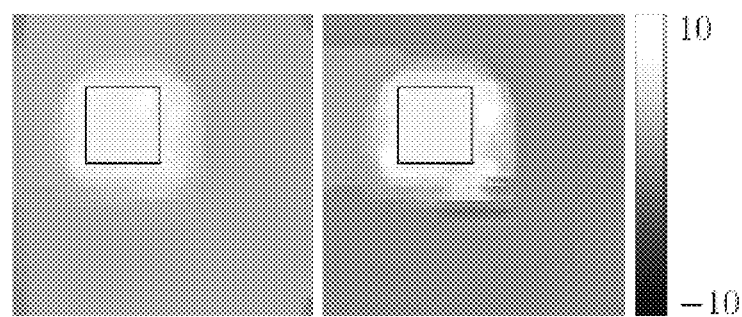
FIG. 10 depicts a final estimate of the optical flow over a phase sequence.

The motion mask, the segmented object data, and the optical flow are then used to determine the magnitude and direction of motion for each moving object in the scene. As shown in FIG. 8, motion is assumed to be approximately linear throughout a scene being imaged. Because the optical flow method is able to cope with large displacements, an optical flow of each phase step image with respect to the first may thus be obtained. Based on the assumption of linear motion, optical flow estimates increase linearly with respect to the phase steps. A straight line is therefore used at each pixel to represent each component of the optical flow with respect to the phase steps. This may be modeled, as shown in the formula below in which K is an 8×2 matrix with k−1 as the first column and the ones as the second column, and in which $u_x$ and $u_y$ are vectors with the kth x and y direction flow estimates on the kth entry, where $\{u_x\}_{k=1}=\{u_y\}_{k=1}=0$. Accordingly, the linear model of motion at each pixel may be represented as:

$$u_x = K\begin{bmatrix} v_x \\ b_x \end{bmatrix}, \quad (39)$$

$$u_y = K\begin{bmatrix} v_y \\ b_y \end{bmatrix},$$

where $v_x$ and $v_y$ are the slope of the line, and $b_x$, $b_y$ are offsets. The line parameters are then easily found using a least squares regression. Assuming linear motion, $b_x=b_y=0$ and nonzero values indicate no motion (indicating noise) or non-linear motion. Examples of the optical flow and line fitting are shown in FIG. 9, which shows optical flow at selected pixels over the phase steps to highlight the power of the optical flow algorithm in the region of motion. Using this method, the optical flow in the static region should be zero at each phase step, but may be influenced by the moving object. Additionally, the assumption of linearity is not essential to the method. If the motion is nonlinear then a higher order polynomial equation may be used to represent the flow—with the upper limit of the polynomial order set by the number of phase step measurements. The slope of the lines in FIG. 9 represent the average optical flow over the eight phase step measurements, and is used as the final optical flow estimate used in subsequent processing, as shown in FIG. 10. FIG. 10 represents a final estimate of the optical flow over the phase sequence. The x-direction flow is shown in the left pane, while the y-direction flow is shown in the right pane. The black squares represent the location of the foreground object at the start of the capture period.

It is noted that oversmoothing may make the extraction of accurate boundaries in the motion field poor, but that this tradeoff may be justified in order to obtain optical flow vectors with accurate magnitude and direction in the region of motion over large distances. The average estimated flow vector within the foreground region itself, to the nearest pixel, is u=(6, 6), matching the true motion vector.

(7) Rotating and Scaling the Phase Step Images

Based on the magnitude and direction data, each phase step image is then rotated and scaled so that each moving object travels in a downward direction at a specific rate. Once the estimated region of motion, the object segmentation, and the optical flow $v=(v_x, v_y)$ have been determined, the actual inversion of motion and range decoding may be performed. The inversion of the coded motion may be performed via the following steps, for each moving object, for each kth phase step image. If it is assumed that v is the average optical flow vector for a given moving object, the image is then rotated through $(-90-\angle v)$ degrees so that the direction of motion is from top to bottom. The motion is then scaled by $6/\|v\|$ so that the motion is six pixels per phase step image (corresponding to one pixel per CE point). This scaling is a result of the CE performed and the number of phase steps used in this exemplary embodiment of the present disclosure. The scaling may be altered to conform to the CE and the number of phase steps used in other embodiments. It is noted that bilinear interpolation may be used in the image rotation and re-sampling operations. Additionally, the rotating and scaling processes may be implemented in ordinary image space or under other transformations such as Fourier transforms.

(8) Motion Inverting the Rotated and Scaled Phase Step Images

Motion inversion is then performed on the rotated and scaled images for each object at each phase step to compensate for the motion of the objects. This process is facilitated by the coded exposure. Once the rotation and scaling of the kth phase step image of an object has been performed, an estimate of the decoded image may then be determined by inversion of equation (4):

$$I_{0,k}=(H_k^T)^{-1}I_k. \quad (40)$$

The inverse $(H^T_k)^{-1}$ may be precomputed so the computation of equation (40) is direct.

Accordingly, the inverted matrix is applied to the coded exposure in order to invert the object motion. The motion decoding is repeated for each object at each phase step. Alternatively, an inhomogeneous deconvolution procedure, where the shape and orientation of the convolution kernel is determined from the optical flow and the known shape of the exposure code, may be applied. Furthermore, applying an inhomogeneous deconvolution procedure may render the rotating and scaling operations unnecessary.

(9) Reversing the Rotation and Scaling

The rotation and scaling of the motion inverted phase step images is then reversed to generate motion corrected sequential phase step images. Once the motion decoding is completed for the kth phase step image of an object, the motion decoded phase step image may be rotated back through $(90+\angle v)$ degrees and then scaled back to the original image size. Bilinear interpolation may be used in this process. Objects with an average speed of $\|v\|<3$ pixels may be treated as static, because the static background region may appear to have nonzero motion as a result of the optical flow spilling over the boundaries of the moving object, or when the region of motion contains both foreground and background objects. The range phase and active amplitude may then be computed based on the final phase₀step sequence. The final motion corrected sequence may be computed as:

$$I_{0,f,k} = I(1 - m_m) + m_m \sum_{k=1}^{N_k} m_{0,i,k} I_{0,k},\qquad(41)$$

where $N_k$ is the number of moving objects (excluding the static background) and the arithmetic operations are performed pixel-wise.

(10) Decoding the Motion Corrected Images

Figure 12:
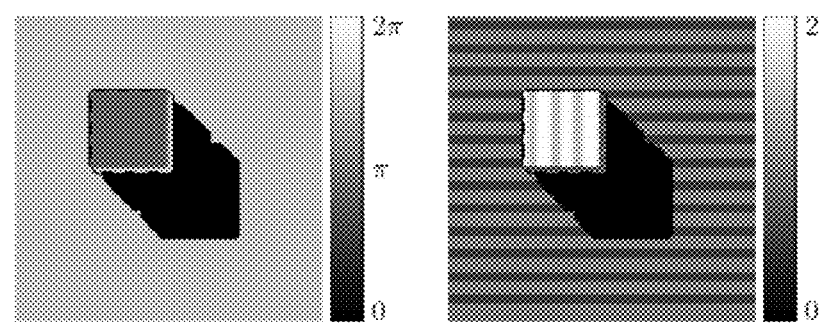
FIG. 12 depicts the reconstructed phase and amplitude with gaps corresponding to static areas under a region of motion.

Following the "undoing" of the rotation and scaling, it is helpful to compose a single phase step sequence based on the decoded estimates and the segmentation of the individual moving objects. This may be accomplished by selecting, at each pixel location in the output sequence, the correct decoded sequence from which to extract a pixel value based on the object that occupies that pixel in the first phase step image. FIG. 11 shows an example of the results of such a comparison of an input phase step sequence and the results of equation (41). As shown in FIG. 11, the motion decoding shifts the moving foreground object opposite to the direction of motion, and into its initial position. The estimate of the range phase $\hat{p}\bullet$ and active amplitude $\hat{A}$ may be computed from the result of equation (41). Exemplary results of this computation are shown in FIG. 12, which depicts the reconstructed phase and amplitude with gaps corresponding to the static areas under the region of motion. Equation (41) may not account for the static background identified by the mask $m_m m_{0,i=0,k=0}$, that is uniquely occluded in each phase step image. As noted above, the results of this omission of the static areas in the region of motion are shown in FIGS. 11 and 12 as zero regions. Because the values for $\hat{p}\bullet$ and $\hat{A}$ in the occluded areas are not defined by equation (41), these pixels may be 'filled in' by taking the corresponding values from $p_{0,k=0}$ and $A_{0,k=0}$, as follows:

$$\hat{p}_f = \hat{p} + m_m m_{0,i=0,k=0} p_{0,k=0},$$

$$\hat{A}_f = \hat{A} + m_m m_{0,i=0,k=0} A_{0,k=0}.\qquad(42)$$

Alternate methods utilizing the handling of missing pixel data at the phase steps, where the background in the region of motion is occluded by the moving foreground, may be performed as well. FIG. 13 depicts exemplary images of range phase and amplitude before and after motion correction. Without motion correction, the moving object is smeared over the region of motion, with computed range phase values varying between the true phase of the foreground object and the background range phase. The active amplitude before correction also varies dramatically over a range of erroneous values. After correction, many of the negative effects of the object's motion are corrected.

(11) Calculating the Range

Range decoding is then performed on the corrected image data to determine the distance to each object in the scene at the start of the sequence. The distances may be determined according to the known techniques described above.

Although the above process includes multiple steps, some of these steps may be performed in parallel, omitted, or supplemented in various embodiments. Also, while the above description involves creating image data where moving objects are returned to their starting position, alternate embodiments may instead move the objects to other positions, such as their ending positions or intermediate positions.

EXAMPLES

Figure 16:
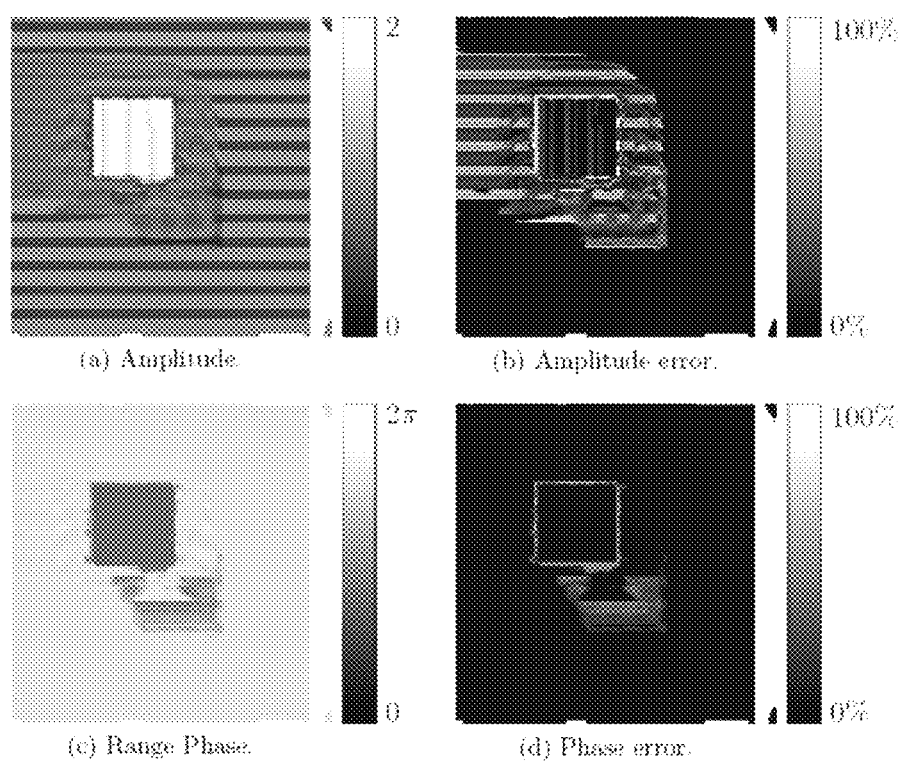
FIG. 16 depicts the results of a simulation comparing phase percentage error and amplitude percentage error between images prior to and following motion correction using a previously known method of motion correction.

As shown in FIGS. 15-19, the above described process compensates for the effects of motion blur. FIG. 15 depicts the results of a simulation comparing phase percentage error and amplitude percentage error between images prior to and following motion correction. FIG. 16 depicts a similar comparison using a previously known method of motion correction.

Figure 17:
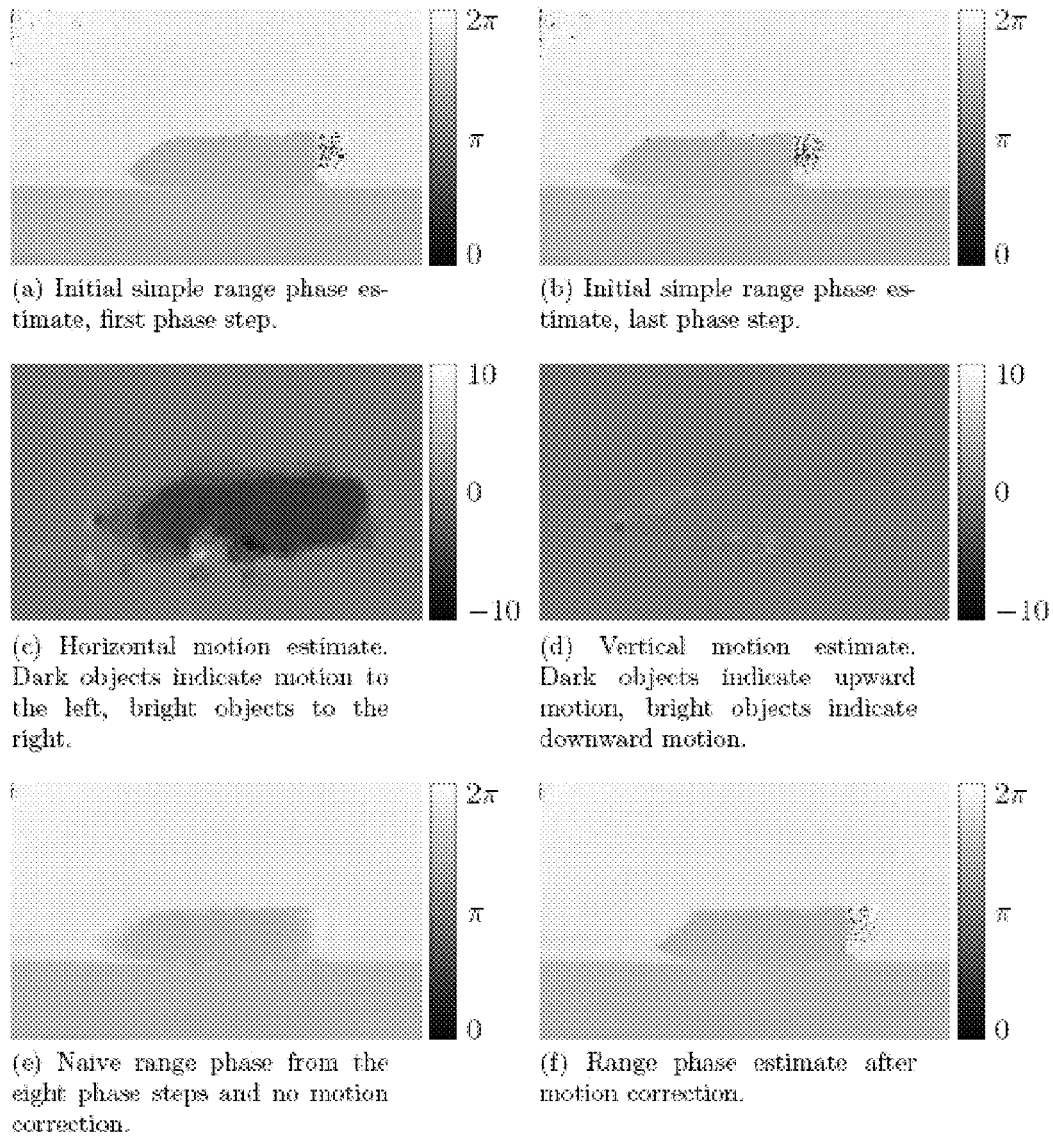
FIG. 17 depicts various images of a train moving across a scene at different stages of the disclosed method of motion correction.
Figure 18:
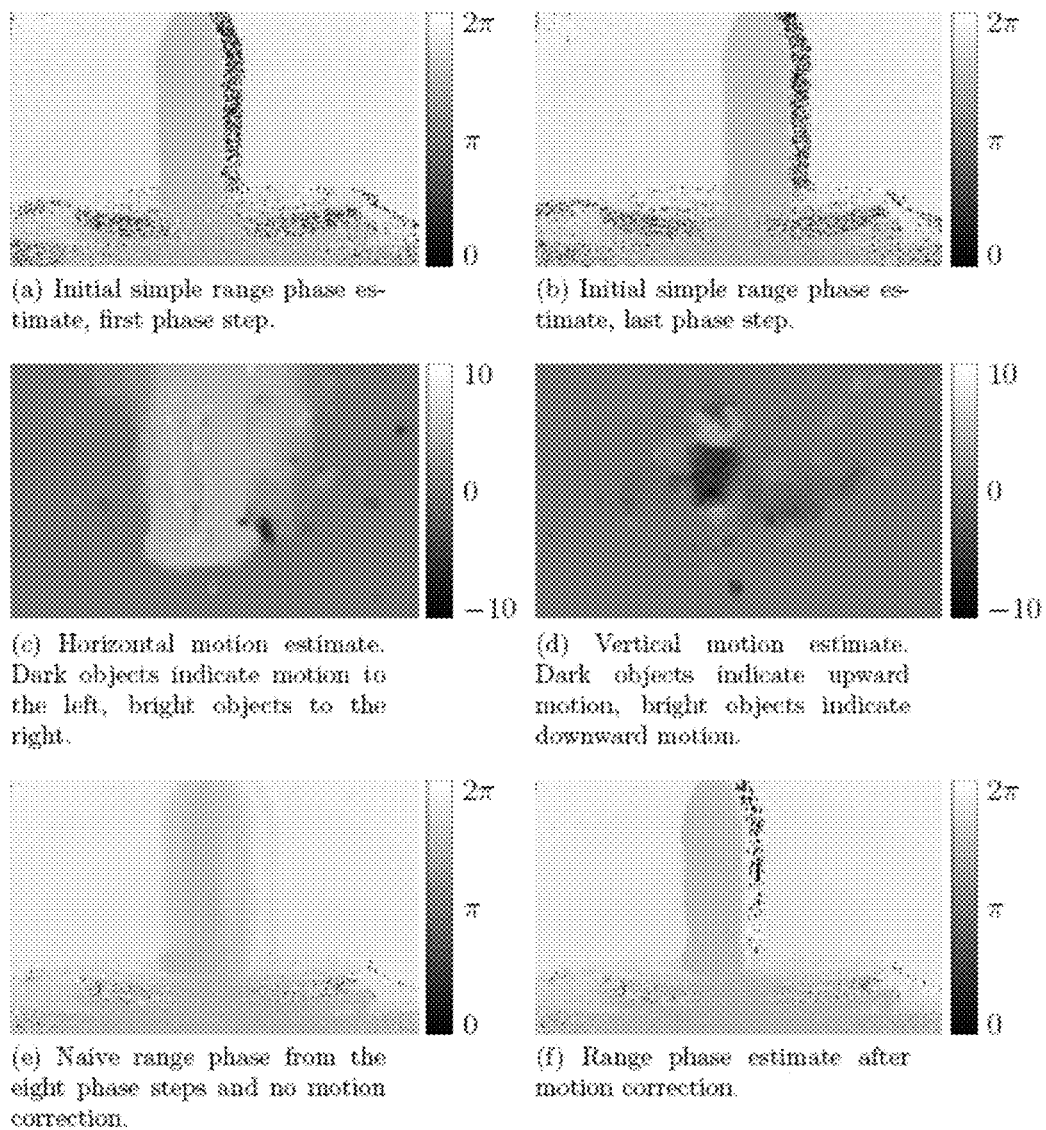
FIG. 18 depicts various images of a bottle moving across and towards a scene at different stages of the disclosed method of motion correction.
Figure 19:
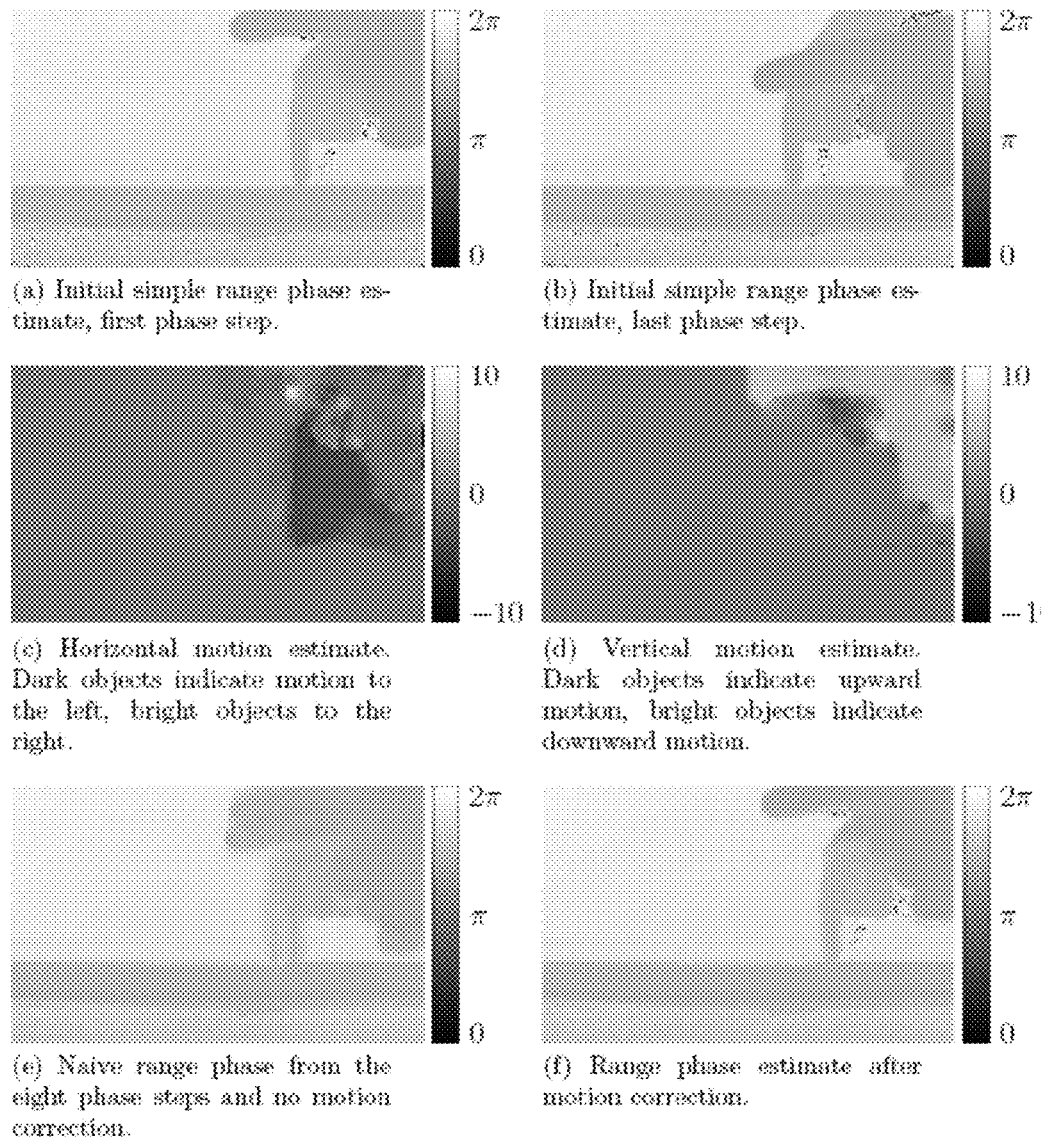
FIG. 19 depicts various images of two hands moving across a scene in different directions at different stages of the disclosed method of motion correction.

Range cameras using embodiments of the above disclosed method were used to capture the images shown in FIGS. 17, 18, and 19, which depict images of a moving train, a bottle, and a hand, respectively, at different steps of the method as labeled. FIG. 17 depicts a train moving across the scene. FIG. 18 depicts a bottle moving in a direction perpendicular to the image plane. FIG. 19 depicts one moving object occluded by another moving object. These images are also shown in FIG. 14.

In each example there is an obvious region of high noise in the range phase images to the left of the moving foreground object in question, due to shadowing of the light source on the background. Without motion correction the shadow region is blurred over, but the motion correction recovers the shadowed region. The acquisition time used was $20 \times 10^{-3}$ seconds per phase step, totaling $160 \times 10^{-3}$ seconds for the full eight phase step sequence—about six phase step sequences per second. The acquisition time may be reduced using alternate hardware devices or alternate process steps. In each example the optical flow estimates appear unrefined, with obvious small regions of erroneous flow estimates pointing in seemingly random directions. The small regions of bad estimation are reflective of the weak smoothness parameters chosen herein to minimize flow overspill into static regions, and are not reflective of the optical flow algorithm used in general. Weak smoothing of the optical flow estimates may sometimes be acceptable as only an accurate estimate under the region of moving objects on average is desired. Small regions of error do not influence the average flow estimates noticeably and are therefore acceptable. If these errors are not acceptable for a particular application, they may be minimized or eliminated by using strong smoothing.

In FIG. 17 the train is moving to the left. In FIG. 18, the bottle is moving to the right and in a circular motion towards and away from the camera. In FIG. 19, one hand is moving to the left and the other is moving down. The optical flow method used provides the desired invariance to brightness effects, including illumination variance between frames and the slight uneven illumination in the simple amplitude images. With the optical flow estimation, increasing the smoothness of the flow vector images can lead to more accurate estimation within an object region, but with a tradeoff of less accurate delineation of the object boundaries in the estimated flow. The overspill of flow vectors into the static background area within the region of motion can lead to erroneous motion estimation, which in turn leads to a possible source of error in the motion correction. Sufficiently accurate optical flow estimates can be obtained for any given scene by manually tuning the parameters to appropriate values, but because the actual parameter values required is scene dependent automatic tuning is preferred.

Other known methods of attempting to compensate for motion blur include combining information from the range image data with a conventional 2D sensor to localize the edges of the moving objects to decide which measurements should be included in range reconstruction and using optical flow on simple intensity images produced by a camera to assist in modeling the effect of perpendicular motion. However, both of these methods have substantial drawbacks. For example, they require substantial and extremely accurate calculations to be performed. This requires more complicated and expensive devices, and slows down the determinations. These drawbacks are unacceptable in many applications.

Prior to performing the preceding steps, it may be beneficial to first perform fixed pattern error removal as a preprocessing step. At the start of the image acquisition, a full phase step sequence may be taken of a static scene to estimate a fixed pattern additive offset. The estimated offset may then be subtracted from each phase step subsequently acquired. The offset corrected sequence may then be used as the raw sequence to be input into the exemplary motion correction procedure according to the present disclosure.

Although embodiments of the present disclosure have been fully described with reference to the accompanying drawings, it is to be noted that various changes and modifications will become apparent to those skilled in the art. Such changes and modifications are to be understood as being included within the scope of embodiments of the present disclosure as defined by the appended claims.

What is claimed is:

1. A method of determining a distance between a range imaging device and at least one moving object, the method comprising:

modulating an image sensor according to a coded exposure;

while modulating the image sensor, acquiring, at the image sensor, an image of at least a portion of a modulated illumination signal reflected from a scene containing at least one moving object;

generating phase step range image data based on the image of the modulated illumination signal reflected from the scene, the phase step range image data comprising a first phase step image and at least a second phase step image;

calculating an initial estimate of a distance between the image sensor and the at least one moving object, and an initial estimate of a brightness of the at least one moving object using a processor, wherein the estimates are based on the acquired phase step range image data;

calculating an optical flow of the moving object based on: i) the initial estimate of the distance between the image sensor and the at least one moving object; ii) the initial estimate of the brightness of the at least one moving object; iii) the first phase step image; and iv) the second phase step image;

generating motion corrected image data by applying an inverted coded exposure to the phase step range image data to correct for the calculated optical flow; and calculating a distance between the image sensor and the at least one moving object based on the corrected image data.

2. The method of claim 1, wherein the coded exposure comprises a sine function.

3. The method of claim 1, wherein the coded exposure comprises a square wave.

4. The method of claim 1, wherein the initial estimate of a distance between the image sensor and the at least one moving object is a two phase estimate.

5. The method of claim 1, wherein the calculating of the optical flow comprises a linear approximation.

6. The method of claim 1, wherein the calculating of the optical flow comprises a non-equispaced inverse Fourier transform.

7. The method of claim 1, wherein the method further comprises illuminating the scene using an amplitude modulated continuous wave signal.

8. A method of determining a distance between a range imaging camera and a plurality of moving objects, the method comprising:

modulating an image sensor according to a coded exposure;

while modulating the image sensor according to the coded exposure, capturing, at the image sensor, an image of at least a portion of a modulated illumination signal reflected from the plurality of moving objects;

generating raw sequence image data based on the captured image at an image, the raw sequence image data comprising a plurality of sequential phase step images of a scene comprising the moving objects;

receiving the raw sequence image data at a processor;

estimating a two phase estimate of a distance between the range imaging camera and each of the moving objects;

generating a motion mask, utilizing the sequential phase step images, to identify areas in the raw sequence image data that include image data related to the moving objects;

segmenting the raw image data utilizing the motion mask to isolate an area of the raw image data corresponding to each of the moving objects;

determining an optical flow of each of the moving objects based on the two phase estimates and the object segmentation;

calculating a magnitude and a direction of the optical flow of each of the moving objects;

rotating and scaling the sequential phase step images based on the calculated magnitude and direction of the optical flow of each of the moving objects;

motion inverting the rotated and scaled sequential phase step images to compensate for the motion of the moving objects;

reversing the rotating and the scaling of the sequential phase step images to generate motion corrected sequential phase step images;

decoding the motion corrected sequential phase step images using the coded exposure to generate a motion corrected phase step sequence; and calculating the distance between the range imaging camera and each of the moving objects based on the motion corrected phase step sequence.

9. The method of claim 8, wherein the image sensor is a CMOS sensor.

10. The method of claim 8, wherein the two phase estimate comprises estimated distance data for each of a plurality of pixels.

11. The method of claim 8, wherein the two phase estimate comprises estimated brightness data for each of a plurality of pixels.

12. The method of claim 8, wherein the optical flow is represented by a plurality of vectors, each of the plurality of vectors associated with one of the plurality of pixels.

13. The method of claim 8, wherein the determining the optical flow comprises a linear approximation.

14. The method of claim 8, wherein the calculating of the optical flow comprises a non-equispaced inverse Fourier transform.

15. The method of claim 8, wherein the coded exposure comprises a square wave.

16. The method of claim 8, wherein the coded exposure comprises a sine wave.

17. The method of claim 8, further comprising illuminating the scene using a modulated illumination signal.

18. The method of claim 17, further comprising generating the modulated illumination signal using a signal generator.

19. The method of claim 8, wherein calculating the distance between the range imaging camera and each of the moving objects comprises decoding a distance for each pixel in the motion corrected phase step sequence.

20. A range imaging camera, comprising:
- an illumination source to illuminate a scene using a modulated illumination signal;
- an image sensor to capture raw sequence image data from the illuminated scene using a coded exposure, wherein the image sensor is configured to capture at least a portion of the modulated illumination signal reflected from at least one moving object in the illuminated scene; and
- a processor to process the raw sequence image data to correct for motion in the captured raw sequence image data, wherein the processor is configured to perform the following:
- calculating a two phase estimate of a distance between the range imaging camera and the moving object based on the raw sequence image data;
- generating a motion mask, based on the raw sequence image data, to identify areas in the raw sequence image data that includes image data related to the moving object;
- segmenting the raw sequence image data to isolate an area of the raw sequence image data corresponding to the moving object based on the motion mask;
- determining an optical flow of the moving object based on the two phase estimate and the segmented raw sequence image data;
- calculating a magnitude and a direction of the optical flow of the moving object;
- rotating and scaling the raw sequence image data based on the calculated magnitude and direction of the optical flow of the moving object;
- motion inverting the rotated and scaled raw sequence image data to compensate for the motion of the moving object;
- reversing the rotating and the scaling of the raw sequence image data to generate motion corrected sequence image data;
- decoding the motion corrected sequence image data using the coded exposure to generate decoded motion corrected sequence image data; and
- calculating the distance between the range imaging camera and the moving object based on the decoded motion corrected sequence image data.

21. The range imaging camera of claim 20, wherein the illumination signal is modulated with an amplitude modulated continuous wave.

22. The range imaging camera of claim 20, wherein the image sensor is a CMOS sensor.

23. The range imaging camera of claim 20, wherein the coded exposure comprises a square wave.

24. The range imaging camera of claim 20, wherein the coded exposure comprises a sinusoidal wave.

25. The range imaging camera of claim 20, wherein the image sensor transmits the raw sequence image data to the processor.

26. The range imaging camera of claim 20, wherein the image sensor comprises a pixel array.

27. The range imaging camera of claim 26, wherein the two phase estimate comprises estimated distance data for each of a plurality of pixels.

28. The range imaging camera of claim 26, wherein the two phase estimate comprises estimated brightness data for each of a plurality of pixels.

29. The range imaging camera of claim 20, wherein the optical flow is represented by a plurality of vectors, each of the plurality of vectors associated with one of the plurality of pixels.

30. The range imaging camera of claim 20, wherein the determining the optical flow comprises a linear approximation.

31. The range imaging camera of claim 20, wherein the determining the optical flow comprises a non-equispaced inverse Fourier transform.

32. The range imaging camera of claim 20, further comprising a signal generator to generate the modulated illumination signal.

33. The range imaging camera of claim 20, wherein the calculating the distance between the range imaging camera and the moving object comprises decoding a distance for each pixel in the decoded motion corrected sequence image data.

* * * * *